United States Patent
Wolterink et al.

(10) Patent No.: US 10,416,419 B2
(45) Date of Patent: Sep. 17, 2019

(54) METHOD FOR MANUFACTURING OPTICAL MODULES

(71) Applicant: Anteryon Wafer Optics B.V., Eindhoven (NL)

(72) Inventors: Edwin Maria Wolterink, Eindhoven (NL); Willem Matthijs Brouwer, Eindhoven (NL)

(73) Assignee: Anteryon Wafer Optics B.V., Eindhoven (NL)

( * ) Notice: Subject to any disclaimer, the term of this patent is extended or adjusted under 35 U.S.C. 154(b) by 278 days.

(21) Appl. No.: 15/321,627

(22) PCT Filed: Jun. 30, 2015

(86) PCT No.: PCT/NL2015/050478
§ 371 (c)(1),
(2) Date: Dec. 22, 2016

(87) PCT Pub. No.: WO2016/003276
PCT Pub. Date: Jan. 7, 2016

(65) Prior Publication Data
US 2017/0160523 A1    Jun. 8, 2017

Related U.S. Application Data

(60) Provisional application No. 62/019,218, filed on Jun. 30, 2014.

(30) Foreign Application Priority Data

Jun. 30, 2014 (NL) .................................. 2013094

(51) Int. Cl.
G02B 5/04       (2006.01)
G02B 13/00      (2006.01)

(52) U.S. Cl.
CPC ........... *G02B 13/0085* (2013.01); *G02B 5/04* (2013.01); *G02B 13/007* (2013.01); *G02B 13/0065* (2013.01)

(58) Field of Classification Search
USPC .................................................. 156/153, 154
See application file for complete search history.

(56) References Cited

U.S. PATENT DOCUMENTS

| 4,128,321 A | 12/1978 | Kobori et al. |
|---|---|---|
| 2003/0090753 A1 | 5/2003 | Takeyama et al. |
| 2010/0085466 A1 | 4/2010 | Fujimori et al. |

FOREIGN PATENT DOCUMENTS

| JP | 2003137615 A | 5/2003 |
|---|---|---|
| JP | 2006337641 A | 12/2006 |

(Continued)

OTHER PUBLICATIONS

International Preliminary Report on Patentability and Written Opinion dated Jan. 3, 2017.
International Search Report dated Aug. 17, 2015.

*Primary Examiner* — Jeffry H Aftergut
(74) *Attorney, Agent, or Firm* — Wood, Phillips, Katz, Clark & Mortimer (57) ABSTRACT

The present invention relates to a method for manufacturing optical modules comprising the following steps: i) providing a wafer having one or more substrate layers; ii) dicing said wafer into multiple parallel oriented strips; iii) tilting said multiple parallel oriented strips; iv) grinding at least one surface of said tilted, multiple parallel oriented strips; v) bonding said grinded surface of said tilted, multiple parallel oriented strips to at least one substrate; vi) dicing said at least one substrate into optical modules.

20 Claims, 11 Drawing Sheets

(56) References Cited

FOREIGN PATENT DOCUMENTS

| | | |
|---|---|---|
| JP | 2010122576 A | 6/2010 |
| WO | 2013049948 | 12/2006 |

METHOD FOR MANUFACTURING OPTICAL MODULES

CROSS-REFERENCE TO RELATED APPLICATIONS

This application claims priority of Provisional Ser. No. 62/019,218, filed Jun. 30, 2014, Netherlands Appln. No, 2013094, filed Jun. 30, 2014 and Appln. No. PCT/NL2015/050478, filed Jun. 30, 2015, the disclosures of which are hereby incorporated by reference in their entirety.

FIELD OF THE INVENTION

The present invention relates to a method for manufacturing optical modules.

BACKGROUND OF THE INVENTION

Such a method is known from JP2006337641. This Japanese document relates to a method for producing prisms having high angular accuracy wherein a laminated glass is obtained by bonding small and large substrates orderly. Subsequently, the glass laminate is cut into several pieces and double side polishing is carried out, wherein the cut glass pieces are divided into short strips by cutting at intervals more than the length of prism in orthogonal to the polishing surface. The short strips are polished along the cut surface with respect to the reference plane and strips are again cut at equal spacing in orthogonal to the polishing surface of double side polishing or short strip polishing.

JP 2010-122576 relates to a method for manufacturing an optical element having at least one optical thin film having a predetermined optical function inside the element, wherein the method includes a laminate joined body-forming step of laminating a plurality of sheets of parallel planar optical components so that the optical thin film and an adhesive are interposed between the components to form a laminate joined body.

WO2013049948 relates to a method for manufacturing an optical element, comprising the steps of providing a wafer comprising a multitude of semi-finished objects, separating said wafer into parts referred to as sub-wafers comprising a plurality of said semi-finished objects, processing at least a portion of said plurality of semi-finished objects by subjecting said at least one sub-wafer to at least one processing step. The wafer according to WO2013049948 comprises a multitude of semi-finished products obtained involving carrying out, e.g., one or more of lithographic processes, replication processes, coating processes, mechanical processes, etching processes, polishing processes and/or others. The wafer is divided into sub-wafers, e.g., by punching, sawing, cutting, or laser cutting, a sub-wafer comprising one or more, usually a plurality of said semi finished products. Then the sub-wafers are processed, wherein the processing may comprise one or more of lithographic processes, replication processes, coating processes, mechanical processes, etching processes, polishing processes and/or others. Then, the processed one or more sub-wafers are separated into a multitude of objects. The so-obtained objects may be used as obtained or may be subjected to further processing, e.g., to a packaging process or to a mounting process in which the object is mounted to another element or device.

JP 2003-137615 relates to a method for manufacturing optical devices, such as beam splitters, wherein two glass plates having a prescribed thickness, length and width are joined via an adhesive to form a plate laminate and this plate laminate is cut parallel to one lateral face in a prescribed width in such a way as to make bottom faces nearly square to form a plurality of blocks to be polished in a prescribed length, wherein joint surfaces extend parallel nearly at the centers. The four corners of each of the blocks to be polished are polished in such a way that the joint surface becomes a diagonal line of the square bottom face to form a regular quadratic prism-shaped device continuum. In a first step of the polishing, the polished block, as the diagonal of the square end surface is vertical, is attached to the first polishing jig and polished, and in a second step the first intermediate polishing block thus obtained is rotated 90° and attached to the first polishing jig again. In a third step the second intermediate polishing block thus obtained is rotated 90° and mounted on a second polishing jig and polished for obtaining the third intermediate polishing block. In the final step of polishing the third intermediate polishing block is rotated 90°, mounted on a third polishing jig and polished. The device continuum formed by this polishing process is cut at predetermined intervals by a cutting device, such as a cutter, and is a beam splitter.

US 2010/085466 relates to a method for manufacturing an image pickup unit comprising: a step of bonding plural lens wafers, on which optical components are formed, and forming a lens unit wafer including plural lens units; a step of bonding a bending optical element wafer including plural bending optical elements to a first surface of the lens unit wafer such that the plural bending optical elements are respectively opposed to the plural lens units and forming an optical unit wafer; a step of bonding a sensor wafer including plural solid-state image pickup devices to a second surface opposed to the first surface of the lens unit wafer in the optical unit wafer such that the plural solid-state image pickup devices are respectively opposed to the plural lens units and forming an image pickup unit wafer; and a step of separating and individualizing the image pickup unit wafer for each of the lens units, the bending optical elements, and the solid-state image pickup devices and manufacturing plural image pickup units. This US patent application teaches to manufacture plural optical units by bonding the plural lens wafers, on which the optical components are formed, and forming the lens unit wafer including the plural lens unit, bonding the bending optical element wafer including the plural bending optical elements to the first surface of the lens unit wafer and forming the optical unit wafer, and individualizing the optical unit wafer. The bending optical element includes, for example, a prism and is provided by bonding the emission surface to an outer surface of a flat plate serving as the first surface of a lens unit. A bending optical element wafer including a plurality of such bending optical elements is bonded to the first surface forming an incident surface of the light beam of a lens unit wafer, specifically, an outer surface of the lens wafer such that the bending optical elements are respectively opposed to the lens units and emission surfaces of the bending optical elements are set in contact with the lens units, and an optical unit wafer including a plurality of the optical units is formed.

US 2003/090753 relates an optical system such as a viewing or image pickup optical system that is used with an image display device or the like which may be mounted over the head or face of an observer or added to cellar phones or easy-to-carry information terminals.

U.S. Pat. No. 4,128,321 relates to a single lens reflex camera having a pentagonal prism.

Many mobile devices, such as mobile phones and tablet computing devices include cameras that may be operated by a user to capture still and/or video images. Because the mobile devices are typically designed to be relatively small, it can be important to design the cameras or imaging systems to be as thin as possible in order to maintain a low-profile mobile device. In various conventional devices, the thickness of the mobile device is maintained as small as possible by turning either the image sensor or the lens group on its side and using reflective devices to bend the rays to the sensor. It is also possible to maintain the thickness of the mobile device as small as possible by shortening the focal length of the imaging system.

An object of the present invention is to provide a method for manufacturing optical modules, in which optical modules the total track length is reduced to a minimum.

Another object of the present invention is to provide a method for manufacturing optical modules, wherein the thickness of the optical modules is maintained as small as possible by shortening the focal length of the imaging system without deteriorating its optical performances.

SUMMARY OF THE INVENTION

The present invention thus relates to a method for manufacturing optical modules comprising the following steps:
  i) providing a wafer having one or more substrate layers;
  ii) dicing said wafer into multiple parallel oriented strips;
  iii) tilting said multiple parallel oriented strips;
  iv) grinding at least one surface of said tilted, multiple parallel oriented strips;
  v) bonding said grinded surface of said tilted, multiple parallel oriented strips to at least one substrate;
  vi) dicing said at least one substrate into optical modules.

The present inventors found that by using such a method for manufacturing optical modules one or more of the above identified objects can be achieved. In step ii) of the present method the wafer is diced into multiple parallel oriented strips and after dicing the intermediate strips are removed. This means that when dicing a wafer into parallel oriented strips A1, A2, A3, A4 etc. only strips A1, A3, A5 etc. will be used for the next step of tilting. The removal of these strips A2, A4 etc., also called "dummy" strips, is necessary to carry out the step of tilting the multiple parallel oriented strips. The distance or space between the dicing or cutting lines determines the maximum tilt angle of the strips. However, in a specific embodiment the "dummy strips" can be taken away for further processing. Although in the present application the word wafer is used, such a wafer can have a circular, square, rectangular shape, but is not restricted to any shape.

According to a preferred embodiment of the present method in step i) a wafer having at least two substrate layers is provided, wherein especially the at least two substrate layers have different optical properties. The different optical properties are preferably chosen from the group of Abbe numbers and refractive index, or a combination thereof. The application of at least two substrate layers provides optical modules having an optimum optical performance.

According to a preferred embodiment of the present method step iii) further comprises a step of placing said multiple parallel oriented strips between two parallel oriented chucks and displacing one of said chucks for tilting said multiple parallel oriented strips. By displacing one of the chucks the said multiple parallel oriented strips will be tilted at a certain angle. In order to have a construction in which the tilted, multiple parallel oriented strips will maintain their tilted position, it is preferred to apply an adhesive on a side of said multiple parallel oriented strips and curing said adhesive in such a way that said tilted, multiple parallel oriented strips are connected to each other. The location of the adhesive is such that only the contact area between adjacent strips is provided with adhesive. An example of such an adhesive is a thermal curing adhesive or an actinic curable adhesive.

In the present method step iv) further comprises grinding both surfaces of said tilted, multiple parallel oriented strips, wherein it is preferred that step v) further comprises positioning both said grinded surfaces of said tilted, multiple parallel oriented strips between two substrates and bonding said strips to said two substrates. The present inventors also found that in a specific embodiment step v) can be replaced by direct replicating one or more lenses on the grinded surface.

According to a preferred embodiment step iii) further comprises filling the cavities formed between said tilted, multiple parallel oriented strips with a curable resin, curing said resin and replicating one or more lenses on the resin thus cured.

According to another embodiment of the present method for manufacturing optical modules the step of tilting is carried out by positioning said multiple parallel oriented strips in a chuck provided with preformed inclined recesses. In such an embodiment the tilt angle is determined by the chuck. Since it is preferred to apply only one step of tilting, there is only one specific chuck required. In addition, there is no need to pick the multiple parallel oriented strips from one chuck having a specific angle and to place them in another chuck having a specific angle that is different from the other chuck. Transferring parts from one chuck to another may result in breakage of the parts and possible contamination and should thus be prevented.

According to another embodiment of the present method for manufacturing optical modules, i.e. after the step of grinding iv), the thus grinded strips are not tilted and grinded again.

According to another embodiment of the present method for manufacturing optical modules the step iii) of tilting is only carried once.

20. A method according to any one or more of the preceding claims, wherein in step v) said at least one substrate is a glass layer.

The present wafer is a wafer stack chosen from the group of a wafer stack comprising two glass layers with one or more intermediate layers sandwiched between said two glass layers and a wafer stack comprising a glass substrate provided with replicated lenses.

Examples of intermediate layers are chosen from the group of diaphragm, aperture, anti-reflection layer, mirror layer, beam splitter and IR filter.

In specific embodiments the surface obtained after grinding is somewhat rough and it is preferred to smooth the surface.

In a specific embodiment the substrate of step v) comprises a glass layer provided with one or more replicated lenses. In another specific embodiment the at least one substrate in step v) comprises a glass layer. Such a glass layer may further comprise additional functional layers, such as one or more of the aforementioned intermediate layers.

According to a preferred embodiment the present method further comprises a step vi) comprising picking and placing said optical modules onto a support chosen from the group of glass wafer, lead frame, FR4 board, tape and silicon wafer.

The products obtained after step vi) may be diced and singulated for creating more surfaces or for mounting into an assembly of components.

BRIEF DESCRIPTION OF THE DRAWINGS

Various aspects of the present invention are illustrated by way of example, and not by way of limitation, in the accompanying drawings, wherein:

FIG. 1 shows several process steps of the present method for manufacturing optical modules.

FIG. 2 shows several process steps of the present method for manufacturing optical modules according to another embodiment.

FIG. 3 shows several process steps of the present method for manufacturing optical modules according to another embodiment.

FIG. 4 shows additional process steps of the present method for manufacturing optical modules.

FIG. 5 shows different embodiments of optical modules manufactured according to the present method.

DETAILED DESCRIPTION OF THE PREFERRED EMBODIMENT

Figure 1A:
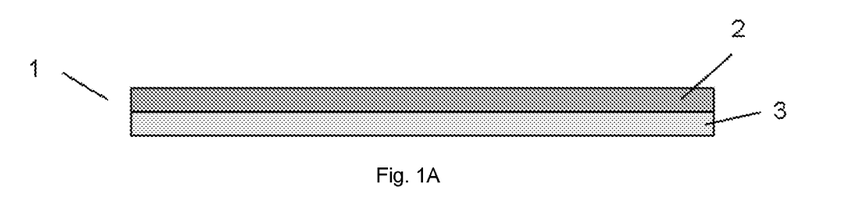
Figure 1B:
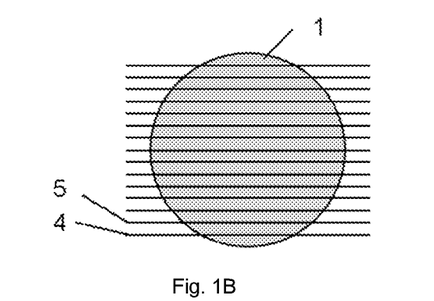
Figure 1C:
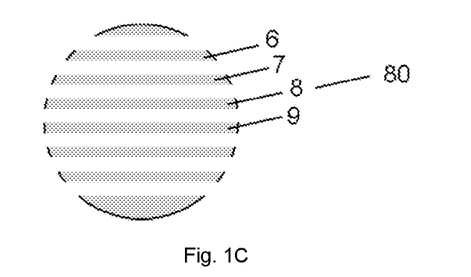
Figure 1D:
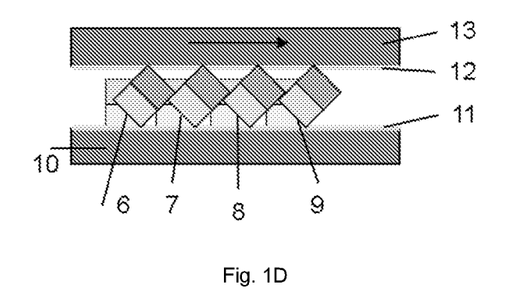
Figure 1E:
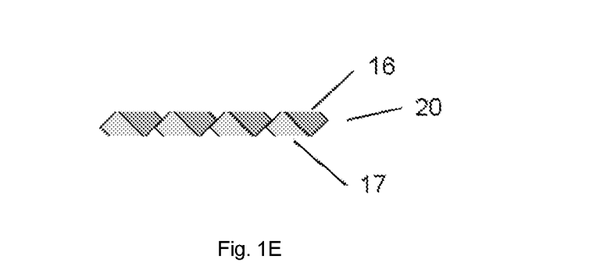
Figure 1F:
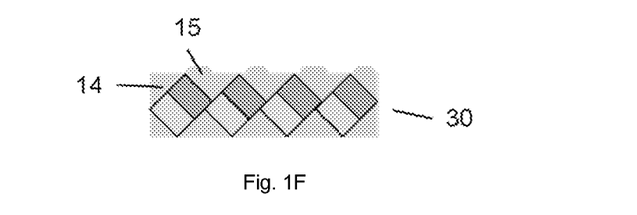
Figure 1G:
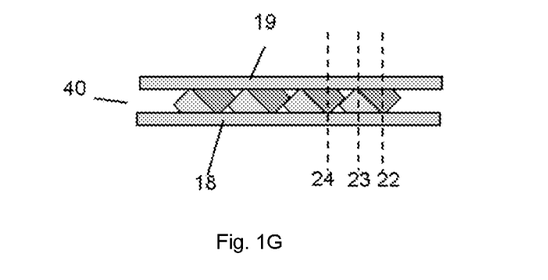
Figure 1H:
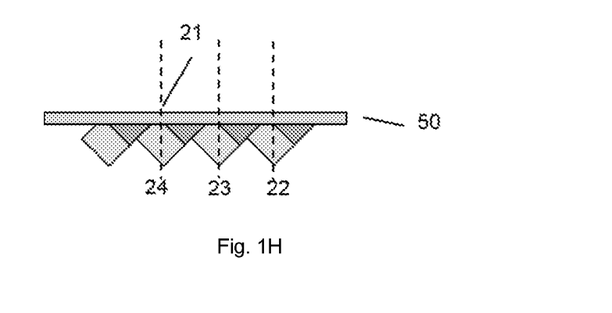
Figure 1I:
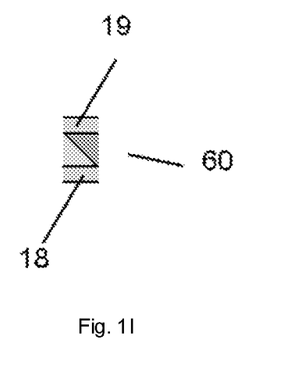
Figure 1J:
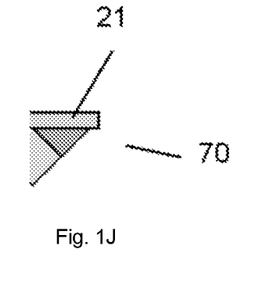
Figure 2A:
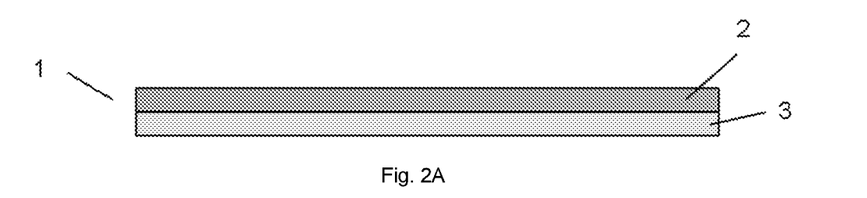
Figure 2B:
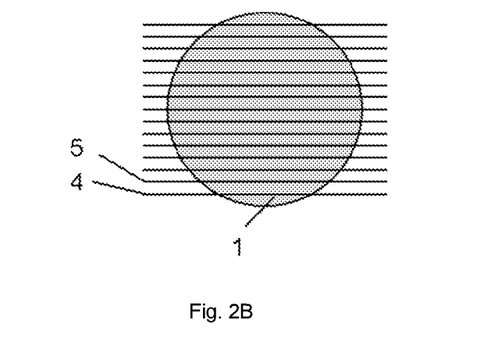
Figure 2C:
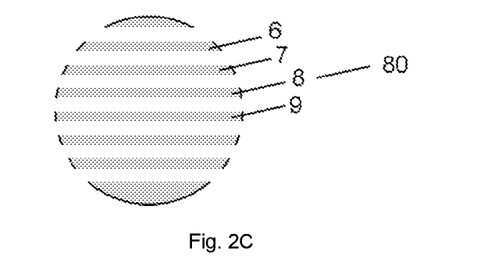
Figure 2D:
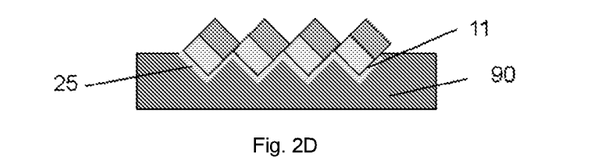
Figure 2E:
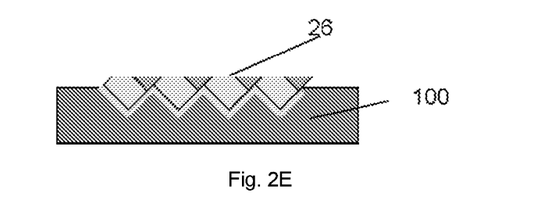
Figure 2F:
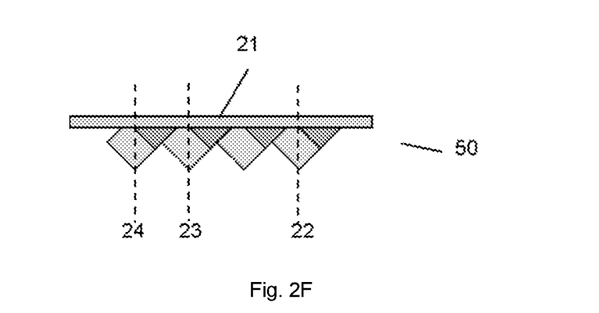
Figure 2G:
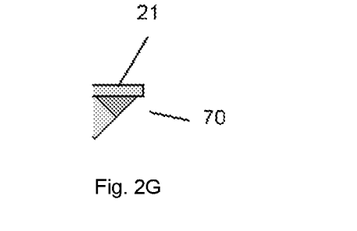
Figure 3A:
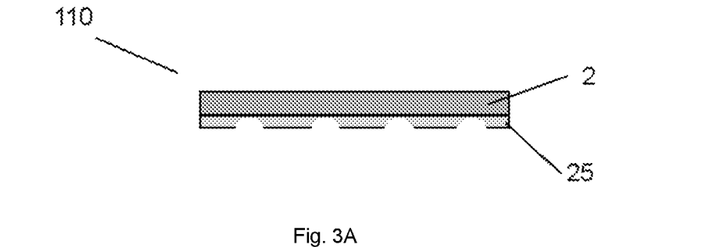
Figure 3B:
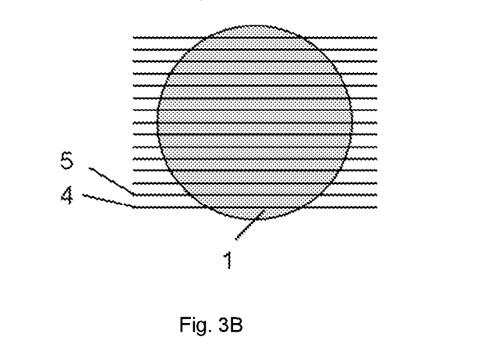
Figure 3C:
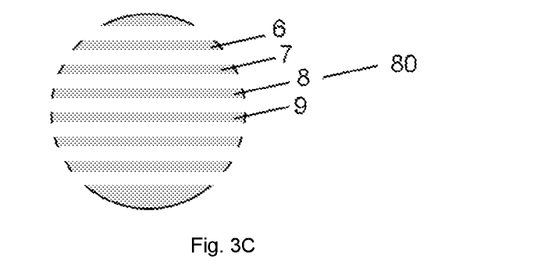
Figure 3D:
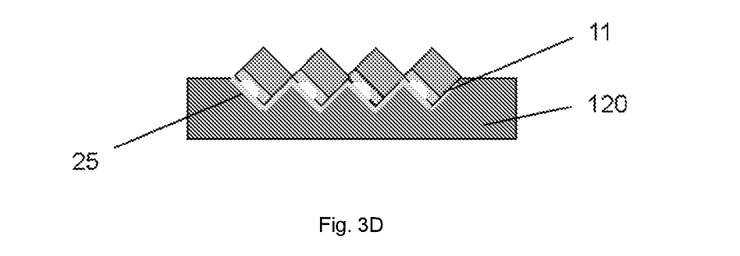
Figure 3E:
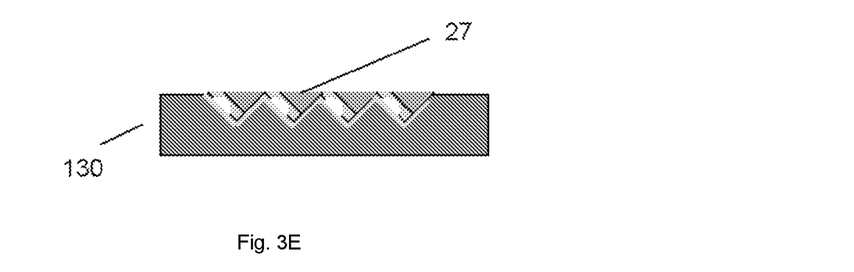
Figure 3F:
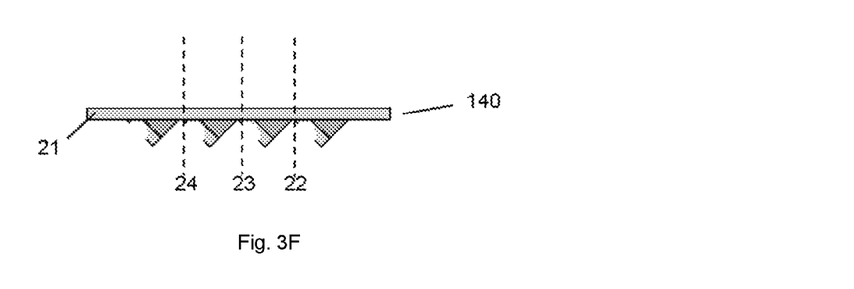
Figure 3G:
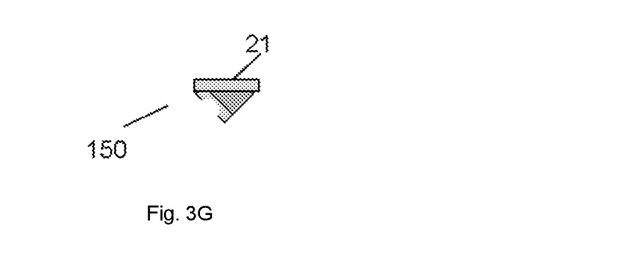

FIG. 1A shows a wafer 1 comprising two layers 2, 3, for example two glass layers. These two glass layers 2, 3 preferably have different optical properties, for example different Abbe numbers, different refractive indices, or a combination thereof. Wafer 1 may also comprise one or more additional layers (not shown), such as diaphragm, aperture, anti-reflection layer, mirror layer, beam splitter and IR filter. In FIG. 1B Wafer 1 is diced through dicing lines 4, 5 into multiple parallel oriented strips 6, 7, 8, 9 resulting in diced wafer 80 (see FIG. 1C). The dummy strips between multiple parallel oriented strips 6, 7, 8, 9 are removed. In the next step (see FIG. 1D) multiple parallel oriented strips 6, 7, 8, 9 are placed between two parallel oriented chucks 10, 13 wherein the dicing tape 11, 12 contacts the inner surface of chucks 10, 13. By displacing one of chucks 10, 13 the multiple parallel oriented strips 6, 7, 8, 9 are tilted and maintain their tilted position between chucks 10, 13. A side of multiple parallel oriented strips 6, 7, 8, 9 is provided with an adhesive (not shown) and after curing the adhesive the tilted, multiple parallel oriented strips 6, 7, 8, 9 are connected to each other. In a next step the chucks are removed and the upper surface 16 and the lower surface 17 are grinded for obtaining an array 20 of grinded tilted, multiple parallel oriented strips (see FIG. 1E). As shown in FIG. 1F as reference number 30 the upper and lower cavities between the tilted, multiple parallel oriented strips 6, 7, 8, 9 can be filled with a resin 14. On top of the resin 14 one or more lenses 15 may be replicated. According to FIG. 1G an array 20 is placed between two substrates 18, 19 resulting in a construction 40. Construction 40 can be diced into single modules through dicing lines 22, 23, 24 resulting in optical modules 60. In another embodiment chucks 10, 13 are removed and only the upper surface 16 is grinded and the array thus obtained is adhered to a substrate 21 resulting in construction 50. Construction 50 can be diced (see FIG. 1H) into single modules through dicing lines 22, 23, 24 resulting in optical modules 60, 70 (see FIGS. 1I and 1J).

FIG. 2 shows several process steps of the present method for manufacturing optical modules according to another embodiment. FIG. 2A shows a wafer 1 comprising two layers 2, 3, for example two glass layers. Wafer 1 may also comprise one or more additional layers (not shown), such as diaphragm, aperture, anti-reflection layer, mirror layer, beam splitter and IR filter. Wafer 1 is diced (see FIG. 2B) through dicing lines 4, 5 into multiple parallel oriented strips 6, 7, 8, 9 resulting in diced wafer 80 (see FIG. 2C). The dummy strips between multiple parallel oriented strips 6, 7, 8, 9 are removed. In the next step multiple parallel oriented strips 6, 7, 8, 9 are placed in a chuck 90 consisting of a number of parallel oriented slots or recesses 25, wherein dicing tape 11 contacts the inner surface of chuck 90. By using a chuck 90 provided with preformed inclined recesses the multiple parallel oriented strips 6, 7, 8, 9 are placed in a tilted fashion (see FIG. 2D). In the next (see FIG. 2E) step the upper surface 26 of the array of multiple parallel oriented strips 6, 7, 8, 9 is grinded and the construction thus obtained is removed from chuck 90 and adhered to a substrate 21 (see FIG. 2F). The construction 50 thus obtained can be diced into single modules through dicing lines 22, 23, 24 resulting in optical modules 70 (see FIG. 2G). Additional lenses (not shown) may be replicated on a surface of substrate 21 remote from layers 2, 3.

FIG. 3 shows several process steps of the present method for manufacturing optical modules according to another embodiment. FIG. 3A shows a wafer 110 comprising one layer 2, for example a glass layer, and a layer 25 comprising replicated lenses. These two layers 2 and 25 have different optical properties, such as different Abbe numbers, different refractive indices, or a combination thereof. Layer 25 may also comprise one or more additional layers, such as diaphragm, aperture, anti-reflection layer, mirror layer, beam splitter and IR filter. Wafer 1 is diced (see FIG. 3B) through dicing lines 4, 5 into multiple parallel oriented strips 6, 7, 8, 9 resulting in diced wafer 80 (see FIG. 3C). The dummy strips between multiple parallel oriented strips 6, 7, 8, 9 are removed. In the next step multiple parallel oriented strips 6, 7, 8, 9 are placed in a chuck 120 consisting of a number of parallel oriented slots or recesses 25, wherein dicing tape 11 contacts the inner surface of chuck 90 (see FIG. 3D). By using a chuck 120 provided with preformed inclined recesses the multiple parallel oriented strips 6, 7, 8, 9 are placed in a tilted fashion. In the next step the upper surface 27 of the array of multiple parallel oriented strips 6, 7, 8, 9 is grinded (see FIG. 3E) and the construction thus obtained is removed from chuck 130 and adhered to a substrate 21 (see FIG. 3F). The construction 140 thus obtained can be diced into single modules through dicing lines 22, 23, 24 resulting in optical modules 150 (see FIG. 3G).

Figure 4A:
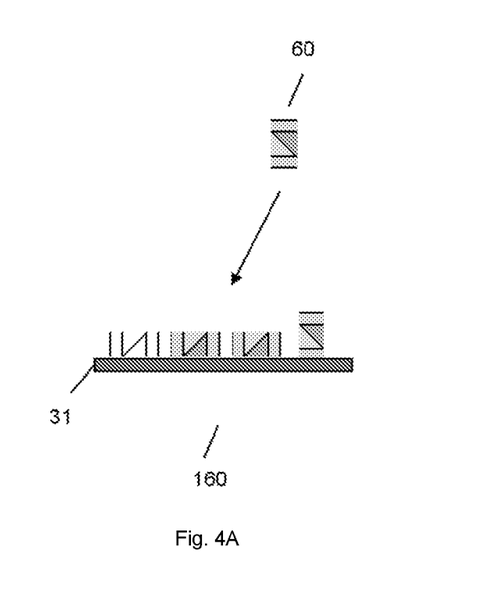
Figure 4B:
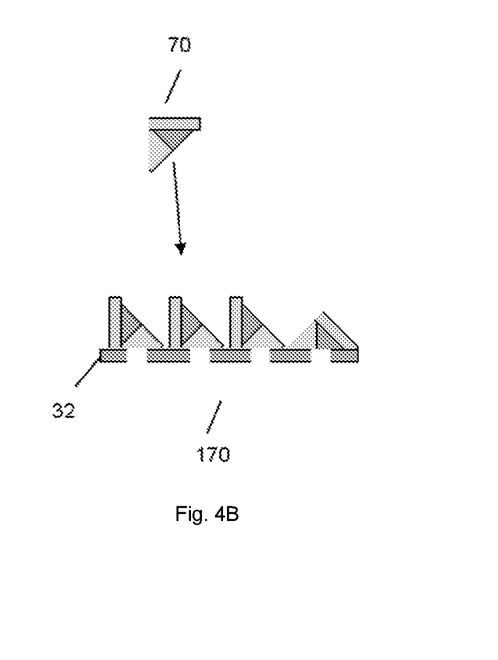
Figure 4C:
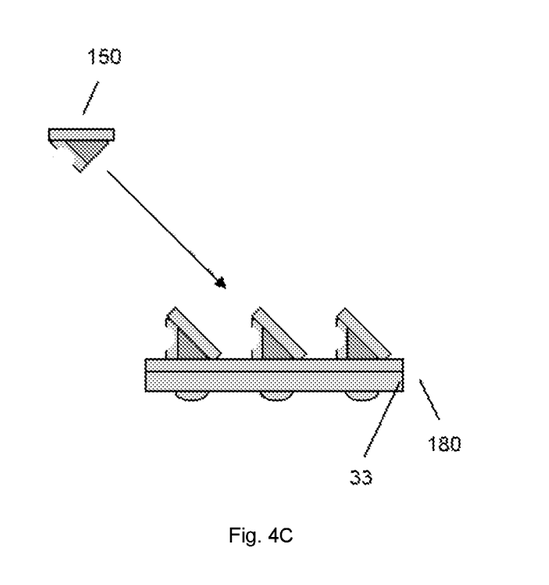
Figure 4D:
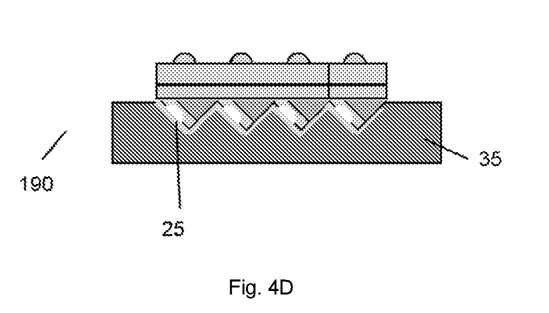
Figure 5A:
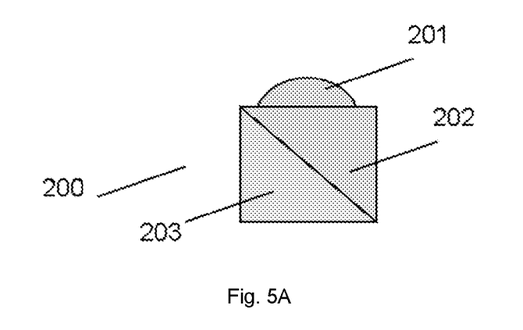
Figure 5B:
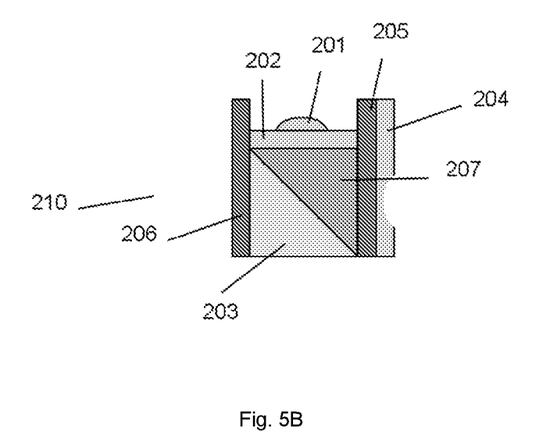
Figure 5C:
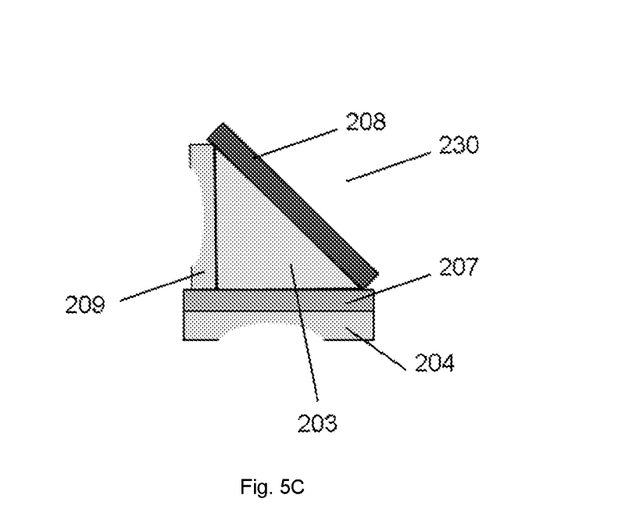
Figure 5D:
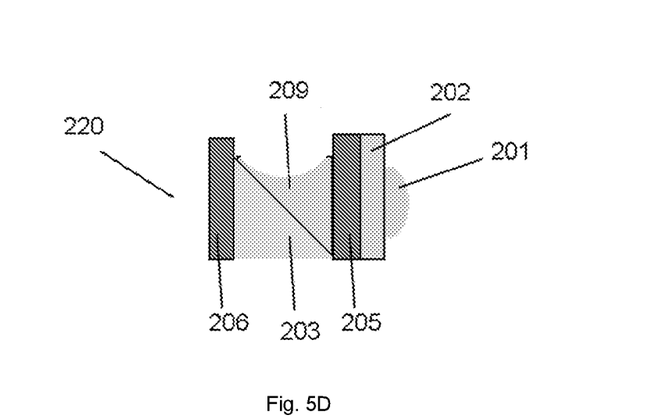

FIGS. 4A, 4B and 4C show additional process steps of the present method wherein single units, i.e. optical modules 60, 70 and 150, are picked and placed with any rotation on a support 31, 32, 33, such as glass wafer, lead frame, FR4 board, dice tape and silicon wafer resulting in constructions 160, 170 and 180. For example glass wafer 33 may comprise one or more replicated lenses and can be placed in a chuck 35 provided with a number of parallel oriented slots or recesses 25 resulting in a construction 190 (see FIG. 4D).

FIG. 5 shows different embodiments of optical modules 200, 210, 220 and 230 manufactured according to the present method. Optical module 200 (see FIG. 5A) comprises substrate 203, for example glass, and resin 202 and lens 201. The interface area between resin 202 and substrate 203 may function as a reflective surface. This means that light entering optical module through lens 201 will leave optical module after deflecting on said reflective surface. In FIG. 5A the light path is from top of lens 201 towards the right side of optical module 200. In another embodiment lens 201 is of the convex shape.

Optical module 210 (see FIG. 5B) comprises substrate 203, 207, for example glass, lens plates 206, 205, replicated lens 201, resin 202, and replicated lens 204. In this optical module the interface area between substrate 207 and substrate 203 may function as a reflective surface. Replicated lens 201 and replicated lens 204 are preferably perpendicular relative to each other. In another embodiment lens 201 is of the convex shape. In another embodiment lens 207 is of the concave shape.

Optical module 230 (see FIG. 5C) comprises substrate 203, for example glass, a first replicated lens 204, a second replicated lens 209, substrate 207, and reflective layer 208. First replicated lens 204 and second replicated lens 209 are preferably perpendicular relative to each other. In another embodiment lens 204, 209 is of the concave shape.

Optical module 220 (see FIG. 5D) comprises lens plates 206, 205, replicated lens 201, resin 202, and replicated lens 209. In another embodiment lens 201 is of the convex shape.

The optical modules according to the present invention can be used in an optical system comprising, from the object to the image, a lens group comprising one or more lenses, an optical module according to the present invention, and an image sensor.

The present invention further relates to an image capturing system comprising an optical module as discussed above, such as a cell phone, digital camera, tablet computer, personal digital assistant, or the like. There are many portable computing devices in which a reduced thickness imaging system such as is described herein would provide advantages. Image capturing system may also be a stationary computing device or any device in which a thin imaging system would be advantageous. A plurality of applications may be available to the user, such traditional photographic and video applications, high dynamic range imaging, panoramic photo and video, or stereoscopic imaging such as 3D images or 3D video.

In the present invention the image sensor may comprise a charge-coupled device (CCD), complementary metal oxide semiconductor sensor (CMOS), or any other image sensing device that receives light and generates image data in response to the received image. Image sensors may be able to obtain image data of still photographs and may also provide information regarding motion in a captured video stream. Sensors may be individual sensors or may represent arrays of sensors. However, as will be understood by one skilled in the art, any suitable array of sensors may be used in the disclosed implementations.

The invention claimed is:

1. A method for manufacturing optical modules comprising the following steps:
   i) providing a wafer having one or more substrate layers;
   ii) dicing said wafer into multiple parallel oriented strips, and removing alternate ones of said multiple parallel oriented strips;
   iii) tilting remaining ones of said multiple parallel oriented strips;
   iv) grinding at least one surface of said tilted, multiple parallel oriented strips;
   v) bonding said grinded surface of said tilted, multiple parallel oriented strips to at least one substrate;
   vi) dicing said at least one substrate into optical modules.

2. A method according to claim 1, wherein in step i) a wafer having at least two substrate layers is provided.

3. A method according to claim 2, wherein said at least two substrate layers have different optical properties.

4. A method according to claim 3, wherein said different optical properties are chosen from the group of Abbe numbers and refractive index, or a combination thereof.

5. A method according to claim 1, wherein step iii) further comprises a step of placing said remaining ones of multiple parallel oriented strips between two parallel oriented chucks and displacing one of said chucks for tilting said multiple parallel oriented strips.

6. A method according to claim 5, wherein step iii) further comprises applying an adhesive on a side of said multiple parallel oriented strips and curing said adhesive in such a way that said tilted, multiple parallel oriented strips are connected to each other.

7. A method according to claim 1, wherein step iv) further comprises grinding both surfaces of said tilted, multiple parallel oriented strips.

8. A method according to claim 7, wherein step v) further comprises positioning both said grinded surfaces of said tilted, multiple parallel oriented strips between two substrates and bonding said strips to said two substrates.

9. A method according to claim 1, wherein step iii) further comprises filling the cavities formed between said tilted, multiple parallel oriented strips with a curable resin, curing said resin and replicating one or more lenses on the resin thus cured.

10. A method claim 1, wherein step iii) further comprises positioning said multiple parallel oriented strips in a chuck provided with preformed inclined recesses.

11. A method according to claim 1, wherein said wafer is a wafer stack chosen from the group of a wafer stack comprising two glass layers with one or more intermediate layers sandwiched between said two glass layers and a wafer stack comprising a glass substrate provided with replicated lenses.

12. A method according to claim 11, wherein said wafer stack includes two glass layers with one or more intermediate layers, and said intermediate layer is chosen from the group of diaphragm, aperture, anti-reflection layer, mirror layer, beam splitter and IR filter.

13. A method according to claim 1, wherein after grinding according to step iv) the surface thus grinded is smoothed.

14. A method according to claim 1, wherein said substrate comprises a glass layer provided with replicated lenses.

15. A method according to claim 1, wherein said method further comprises a step vi) comprising picking and placing said optical modules onto a support chosen from the group of glass wafer, lead frame, flame retardant board, tape and silicon wafer.

16. A method according to claim 15, further comprising dicing and singulating said support provided with said optical modules obtained after step vi).

17. A method according to claim 1, wherein step v) is replaced by direct replicating one or more lenses on the grinded surface.

18. A method according to claim 1, wherein after the step of grinding iv) the thus grinded strips are not tilted and grinded again.

19. A method according to claim 1, wherein the step iii) of tilting is only carried once.

20. A method according to claim 1, wherein in step v) said at least one substrate comprises a glass layer.

* * * * *